Aug. 26, 1930.  J. J. M. L. MARCHAND ET AL  1,774,447
SORTING OR DISTRIBUTING APPARATUS
Filed Oct. 27, 1925   8 Sheets-Sheet 2
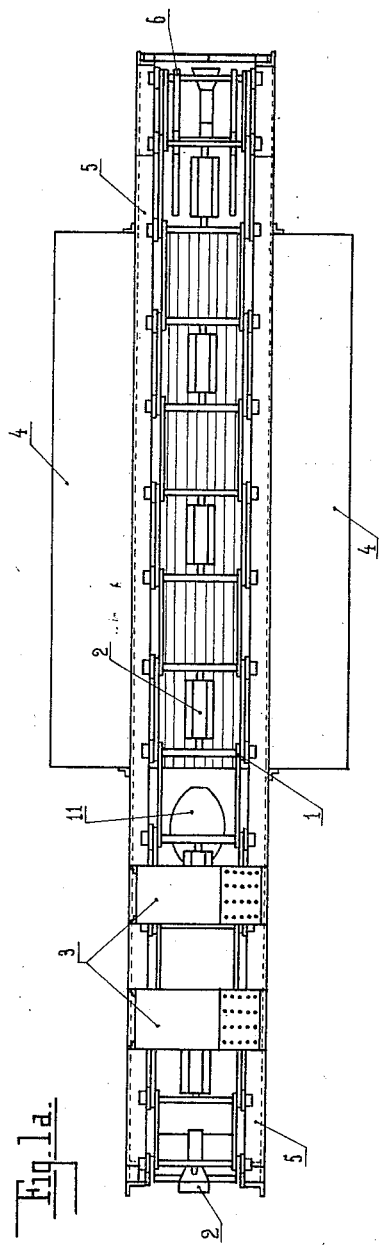
INVENTORS
BY
ATTORNEYS

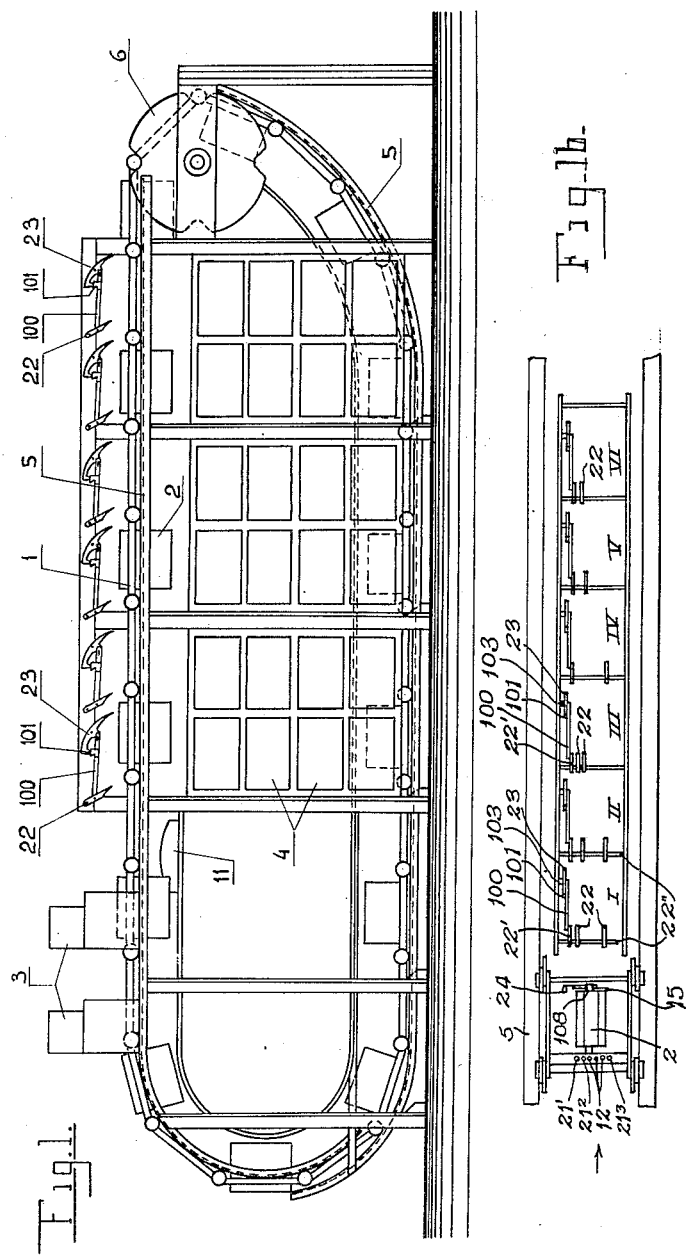

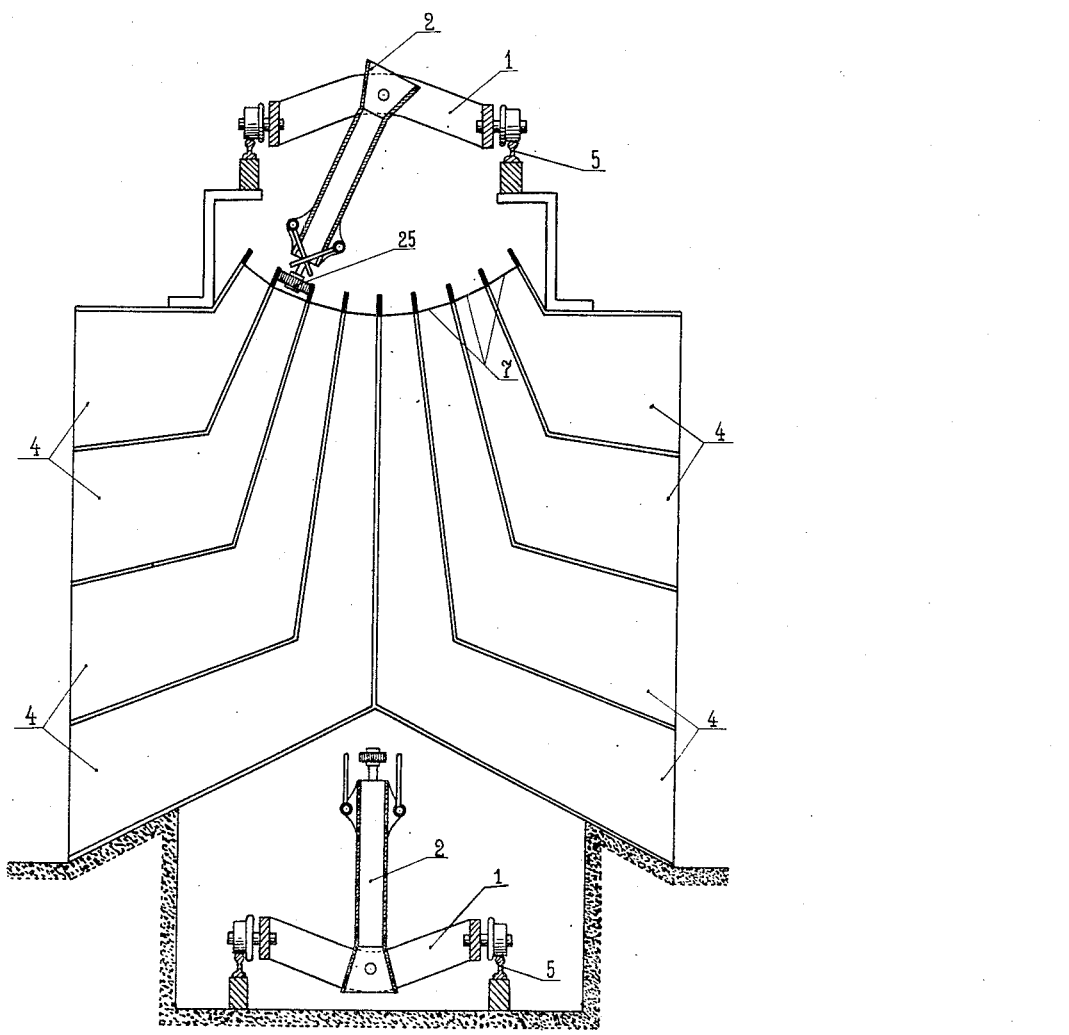

Aug. 26, 1930.    J. J. M. L. MARCHAND ET AL    1,774,447
SORTING OR DISTRIBUTING APPARATUS
Filed Oct. 27, 1925    8 Sheets-Sheet 4

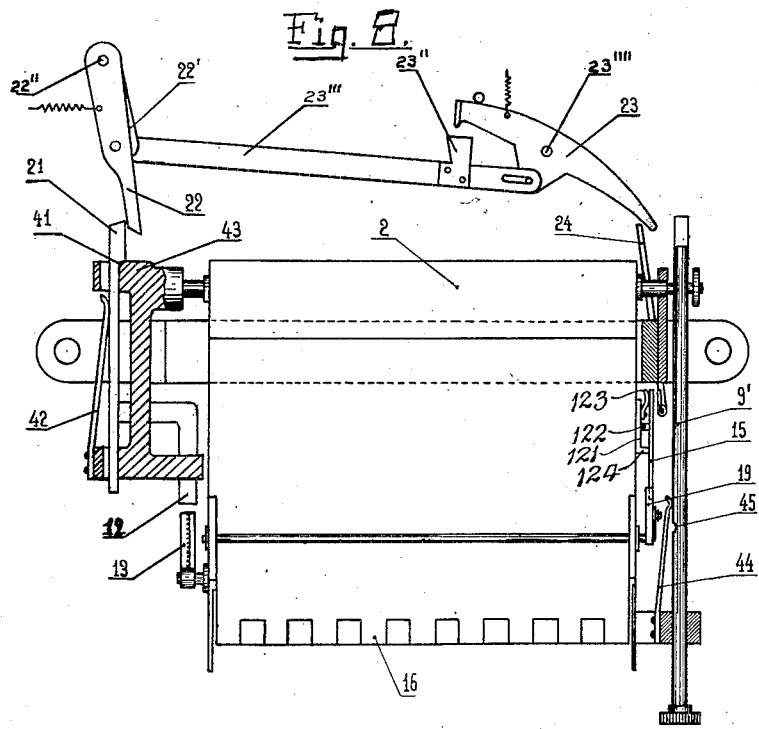
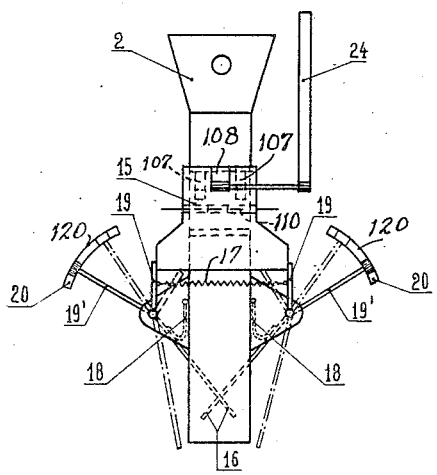
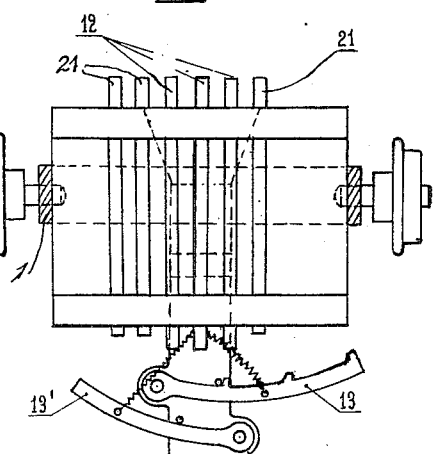

Aug. 26, 1930. J. J. M. L. MARCHAND ET AL 1,774,447
SORTING OR DISTRIBUTING APPARATUS
Filed Oct. 27, 1925   8 Sheets-Sheet 6
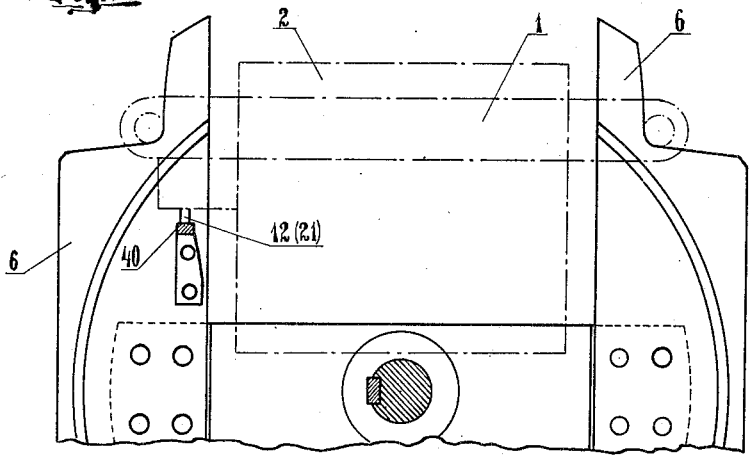
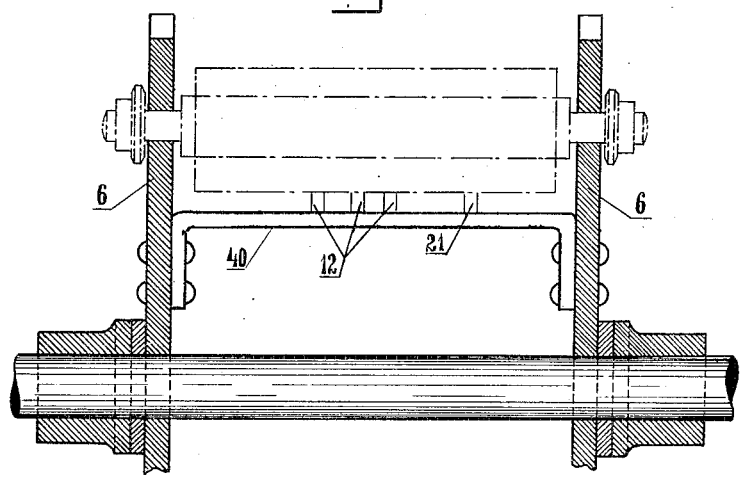
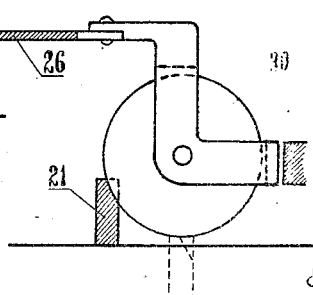

Aug. 26, 1930.    J. J. M. L. MARCHAND ET AL    1,774,447
SORTING OR DISTRIBUTING APPARATUS
Filed Oct. 27, 1925    8 Sheets-Sheet 7
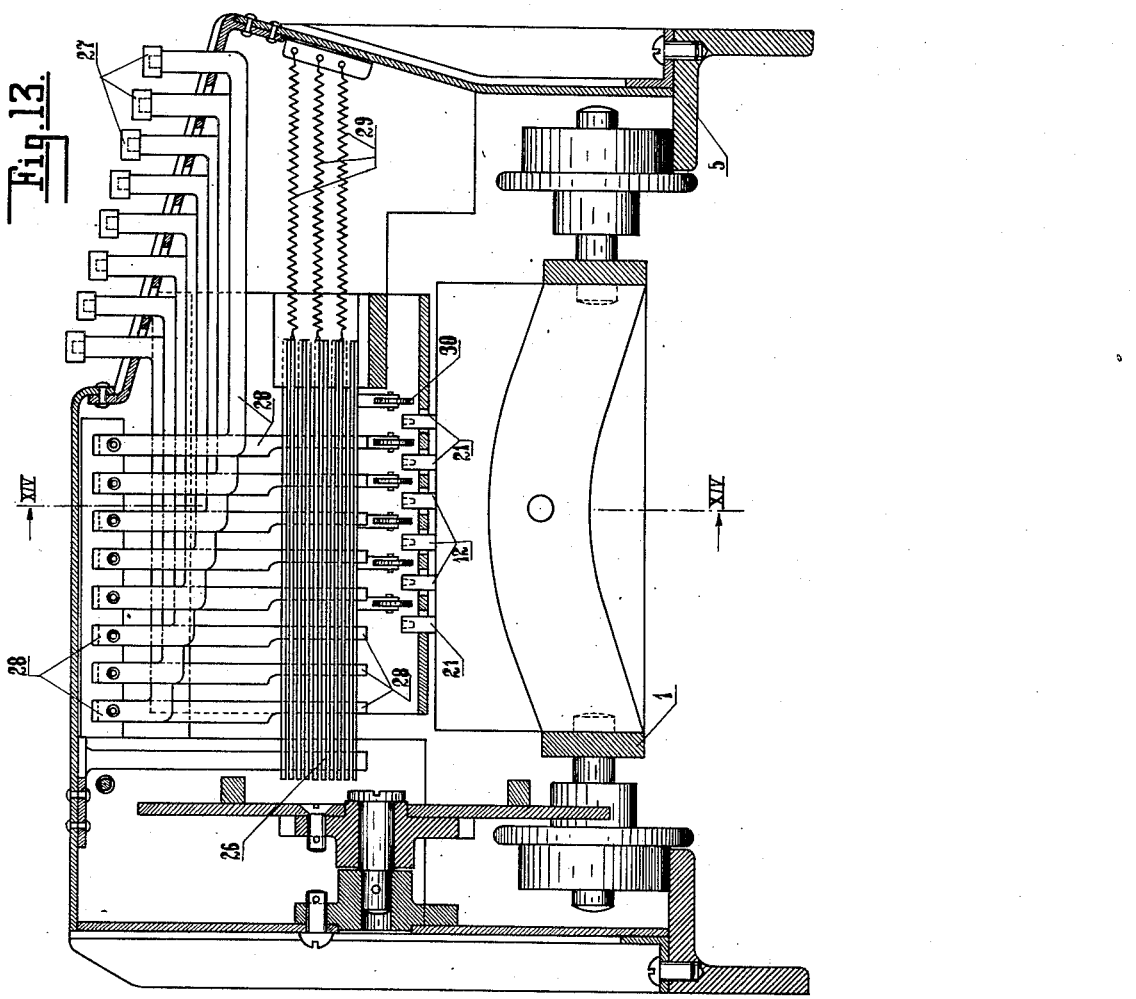

Aug. 26, 1930. J. J. M. L. MARCHAND ET AL 1,774,447
SORTING OR DISTRIBUTING APPARATUS
Filed Oct. 27, 1925 8 Sheets-Sheet 8
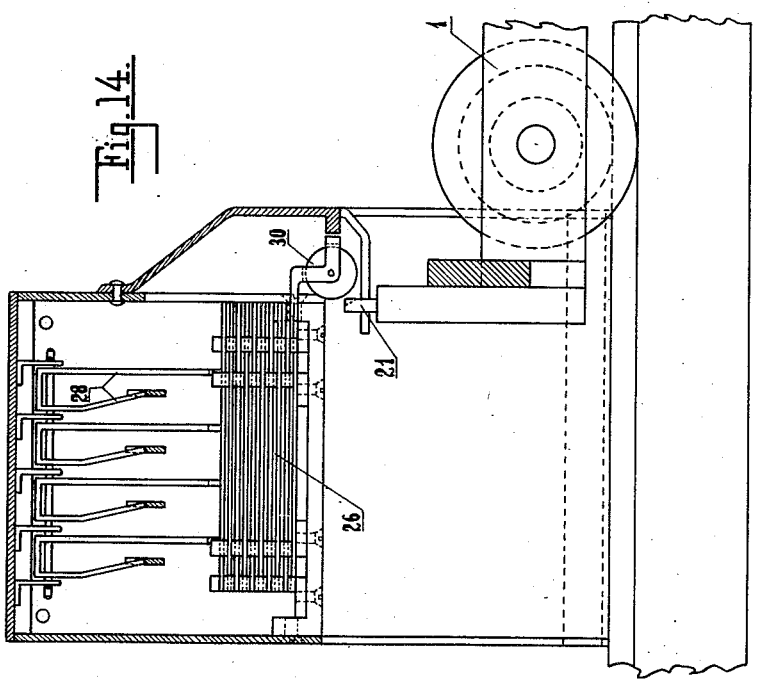

Patented Aug. 26, 1930

1,774,447

UNITED STATES PATENT OFFICE

JEAN JOSEPH MARTIN LAMBERT MARCHAND, OF THE HAGUE, AND JACOBUS COR-
NELIS ANDRIESSEN, OF RIJSWIJK, NETHERLANDS

SORTING OR DISTRIBUTING APPARATUS

Application filed October 27, 1925. Serial No. 65,087.

This invention relates to improvements in sorting or distributing apparatus. More particularly it relates to sorting or distributing apparatus wherein an operator at a suitable control performs appropriate operations of his control apparatus in accordance with the addresses or designations of letters or documents placed in the sorting apparatus; the settings of the mechanism thus effected by the operator bringing about mechanically and automatically the proper sorting or distribution of the letters or documents to their appropriate receptacles.

One of the objects of the present invention is to provide sorting or distributing apparatus of such accuracy that the distribution of the letters or documents to their appropriate receptacles can be relied upon.

A further object is to provide conveyor means of such a nature as to have the greatest possible output so that immediately an operator has read an address or designation and has effected the appropriate setting, he and the apparatus are free for dealing with the next letter or document to be sorted, the first letter or document meanwhile passing on its way through the apparatus and being appropriately sorted or distributed without further care on the part of the operator.

Other objects of the invention are, to avoid connections between the keyboard and the receptacles, such as steel wires for operating cams or the like situated near the receptacles, and to devise an installation composed of only a relatively small number of different components which can be repeated in their use in the installation as found necessary.

According to this invention, the conveyor mechanism may comprise a number of containers wherein the letters or other documents are deposited on an outlet or a bottom, which can automatically be opened at the desired place, upon which documents or letters are placed; the exercise of the control bringing about a setting of selective mechanism whereby a container may be caused to be opened for the delivery of the letter or document upon arriving opposite the appropriate receptacle corresponding with the said setting. Each container may be arranged so that it can be opened about a central longitudinal axis.

The containers when connected in an endless series may have a travel which carries them through a control, such as a keyboard, and then above or between a double row of receptacles, which may be arranged in vertical tiers which, in turn, may be divided into groups. By means of selective mechanism, the letters or documents may be distributed so that each is delivered to its appropriate receptacle in the appropriate group (if different groups are employed) in the appropriate row and in the appropriate tier of the row (if a number of tiers are employed).

The opening of the containers may be advantageously brought about by means of devices located on the containers, or on the carriages carrying them, and capable of being set by the control apparatus, these devices being adapted for co-operation with other devices situated near the respective receptacles. Thus, it may be arranged that when the devices on the containers are not set they have the ability to cause the devices situated near the receptacles to move to an inoperative position so that no opening takes place. On the other hand if the devices on the containers or carriages are set, they will not be able to influence the devices situated near a given receptacle, which devices will then remain active and bring about the delivery of a letter or document.

In installations provided with containers and designed for a large number of receptacles, each container may be mounted in a carriage so that the container can swing about its longitudinal axis in a manner that will cause the discharge mouth of the container to occupy different slanting positions, corresponding with the inlets of the receptacles, which may be placed in juxtaposed rows.

The carriages for the containers may be fitted with depressible pins, studs or the like, some of which may be depressed while others remain elevated after passing through a control apparatus or keyboard. Certain studs may thus be employed to determine whether or not opening is to take place at a given point in the travel.

In installations requiring more than one keyboard, it may be desirable to assign definite carriages to definite keyboards, and each keyboard may be provided with means adapted to co-operate with devices on certain carriages of the chain, whereby any keyboard may be caused to remain locked except during such moments as a carriage coresponding to that keyboard is passing through its operative relationship with that keyboard.

In order to enable the invention in all its details to be readily understood, reference is made to the accompanying drawings which illustrate, more or less diagrammatically and by way of example, different constructions and arrangements of the sorting or distributing apparatus contemplated by the present invention.

Fig. 1 is a side elevation of a sorting installation in accordance with these improvements.

Fig. 1ᵃ is a plan view of the apparatus of Fig. 1.

Fig. 1ᵇ is a plan view of the lever system of the apparatus of Fig. 1.

Fig. 2 is a cross-section on a large scale through two carriages, guide chutes and receptacles.

Fig. 8 is a longitudinal section of a carriage with a container showing a double lever and press pawl located at the point of delivery.

Fig. 9 is a cross section of a container.

Fig. 10 shows the studs and pawls comprising the container tilting mechanism.

Figs. 11 and 12 are a side view and a cross section of a guide wheel for the carriages provided with a bar for bringing depressed studs back into their initial position.

Fig. 13 is a section of a control-device or key-board.

Fig. 14 is a section at right angles to that of Fig. 13 of the control device.

Fig. 15 shows the mounting of a roller for depressing the studs, fixed to a plate or frame of the control device.

Figure 3:
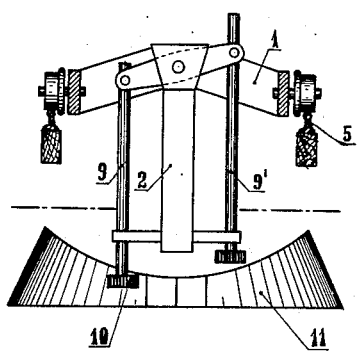
Figs. 3, 4 and 5 show the mechanism for swinging out the container to the left or to the right.

Referring to the drawings, 1 indicates the carriages each carrying a container 2 in which a document of letter to be distributed or sorted may be placed, these carriages being connected together as an endless chain conveyor adapted for travelling on tracks through key-boards 3 and above two rows of receptacles 4.

The carriages have wheels running on rails 5 and passing over a guide-wheel 6.

Each row of receptacles 4 comprises six tiers of four superposed receptacles, but the number of tiers as well as the number in the tiers may be greater or less, as will be readily understood. Each receptacle has a guide chute or channel with an inlet 7 (Fig. 2).

These inlets are placed in juxtaposed rows in a plane which is curved in a direction at right angles to the length of the apparatus so that when a container assumes a slanting position, the outlet of the container corresponds with one of the inlets of the receptacles. In the direction of the length of the apparatus the inlets form a number of juxtaposed courses, $a$—$h$ (Fig. 2). Each course corresponds with a series of receptacles to the left or to the right of the apparatus which are located on the same tier level.

Figure 5:
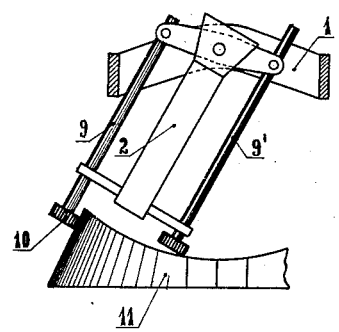
Figure 4:
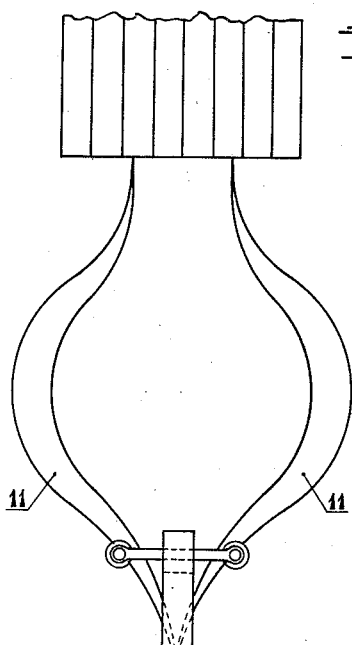

To effect the delivery of a document from the container to one of the receptacles, a depressible pin or stud 9 (Fig. 3) fixed to the front end of the container, is depressed by means of one of the keys of the keyboard. In moving along, a roller 10 on the stud 9 contacts with a broadened part of the track 11 and moves outwardly along this part of the track taking with it the container 2, the container, swinging outward until it assumes its extreme outward position. (Fig. 5).

Figure 7:
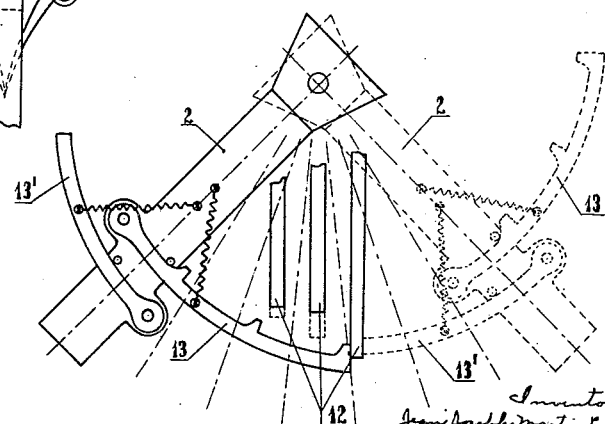
Fig. 7 shows studs and pawls for retaining the container in a definite slanting position.

After the roller 10 has passed the maximum deviation of the track, the container moves back toward its central position, but if a stud 12 (Fig. 7) is depressed by a key of the keyboard, it is held by a pawl 13 in the particular slanting position, corresponding to the particular course, as determined by the stud 12, to which the document is intended to be delivered.

Figure 6:
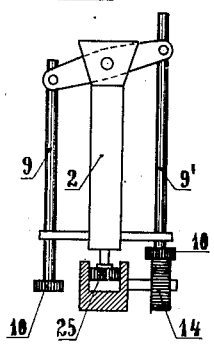
Fig. 6 shows the device for bringing the mechanism of Fig. 5 back to its original position.

The arrangement is preferably made so, that as a rule one of the studs 9, 9′, in this case 9 (Figs. 3 and 6) is normally held depressed to guide the container over the courses on the left side of the apparatus, and the other stud is depressed only when the container is desired to pass along one of the courses on the right hand side. This is obtained by mounting at that part of the track which is travelled after the receptacle has been swung outwardly a device 14, which the depressed stud ascends during the movement of the container, so that the stud is moved upwardly into its original position (Fig. 6).

During the travel of the container, determined by the setting of the studs 9 and 12, and up until the document is intended to be discharged into a given receptacle in any one of the courses $a$—$h$, the container is held closed by a pawl 15 interposed between extending arms 19 of the outlet flaps 16 forming the container bottom. The pawl 15 is secured to the container 2 by means of the pivoted joint member 122 connected to the L shaped iron 121 and the pawl 15 is limited in its movement clockwise by means of the arm 124 of the L shaped iron 121 and the pawl is held flush with the arm 124 by means of spring 123. As shown in Fig. 9, the arms 19 bear against the pawl 15 under the action of a spring 17, so that the contacting edges of the flaps 16, which are toothed, are securely held together.

The flaps close so well and the opening action is so quickly performed, due to the sudden contraction of the spring 17 when the pawl 15 is disengaged from the arms 19, that during opening a sort of suction occurs which causes light letters or thin documents to be forced out of the container with certainty as soon as the pawl 15 is removed. Moreover the flaps are provided with yielding fingers 18, which during the opening grip the document and aid in expelling it. After the container has passed the receptacles, the flaps are closed by the action of the rollers on the ends of the arms 19' contacting with suitable guide rails 120, attached to the frame of the machine, in such a manner that the arms 19' are depressed until the pawl 15 again drops between the arms 19 and holds them in the closed position.

In addition to the previously mentioned studs 9, 9', for determining the swinging of the container to the right or left and the studs 12 for determining the particular course of receptacles, each container is provided with three or more studs 21 for determining over which receptacle of a given course the container is to be opened. (Figs. 8 and 10.)

The studs 21, as are the studs 12 are preferably mounted at the back of the carriage, (Fig. 8), and have a sloping face 41, which by means of a light leaf-spring 42 is pressed against a sloping face 43 of the carriage. In this way, the studs are held firmly in both their end positions but can easily be moved downwardly and upwardly.

The upper end of each stud 21, when not depressed, cooperates with a lever system secured to the machine frame and consisting of a thrust arm 22 and an arm 22' fixed to a common axis 22'', the arm 22' being connected to a pressure pawl 23, pivoted at a point 109, by means of a connecting arm 100 provided with a slot 103 and a stop 101.

Such a lever system is arranged on the machine above every transverse row of receptacles (Figs. 1, 1ᵇ) in such a way that an arm 22 lies in the path of travel of each one of the studs 21 on the container. When one of the studs 21 is not depressed and during the travel of the container contacts with an arm 22 this arm and consequently the arm 22' is rotated about the pivot 22'' in a counter clockwise direction, causing the rod 100 to move to the right (Fig. 8). As soon as the stop 101 is moved to the right a sufficient amount to disengage the stop 102 the right end of the pawl 23 tends to drop down, but before it can do so the left end of the slot 103 contacts with the cooperating pin and rotates the pawl 23 so that the right end thereof is raised.

If, however, one of the studs 21 is depressed, for the purpose of delivering an object in one of the receptacles, the arm 23 located in the path of this stud will not be actuated and hence the rod 100 will not be moved to raise the pawl 23, the right end of which will therefore remain locked in its lower position and will coact with a lever 24 on the front of the container and cause the opening of the flaps 16.

The lever 24 engages the depressed end of the pawl 23 with the result that as the container moves forward the lever is forced backward and lever arm 24 of the container, with an arm 108 on the other end of the lever thrusts against the platform pawl 15 pivotally mounted at 110, and causes it to leave its place between the lever arms 19, which then snap together under the action of the spring 17 to open the flaps 16 and discharge the document.

After the delivery of the document to the desired receptacle the container continues along the upper track until it reaches the guide wheels 6 (Fig. 1) around which it passes to the bottom portion of its travel. On this guide wheel 6 is arranged the mechanism for returning the studs 12 and 21 to their original position. As shown in Figs. 11 and 12, the wheels 6 are connected by a straight cross bar 40 so arranged that as the container passes around the wheels the bar 40 engages the lower ends of the studs 12 and 21 and pushes them upwardly back to their original position.

The manner in which the several studs 9, 12 and 21 are set and the form of the keyboard employed to accomplish this purpose is shown in Figs. 13, 14 and 15. As illustrated in Fig. 13, the key-board comprises a plurality of key-levers 28 of toggle form suspended at their knee points and so arranged that the lower ends thereof move in slots in a plurality of horizontal plates 26 slidably mounted one above the other.

Each plate, as shown in Fig. 15, carries a roller 30 adapted to be pushed by the keys into the path of the studs 9', 12 and 21 as the container moves along on the track below the keyboard. Thus, when one of the keys 27 is depressed the lever 28 swings about its pivot point and the lower end of the lever engages with one or more of the plates 26 and displaces them against the action of their restraining springs 29.

Since each key lever passes through all of the plates 26, the number of plates that are moved by the depression of a single key can be varied by varying the length of the slot in each plate through which each lever passes. That is, if the slots in all of the plates are of the same length, the lever in its movement will displace all of the plates, but if some of the slots are made larger than others a particular key will displace only those plates having the shorter slots since the lever will merely move in the longer slots without engaging the edges thereof.

In this manner, if each key is intended to correspond to a certain combination of the different studs 9′, 12 and 21 the slots in the various plates are so arranged that only those plates adapted to effect that particular combination are moved when the key is depressed.

Upon movement of the particular group of plates controlled by a certain key the rollers 30 carried by those plates are transversely moved into the path of the particular studs 9, 12 and 21 it is intended to actuate. Then, when the container passes beneath the keyboard, the rollers 30 depress the studs and thereby set the container which later deposits its burden in one of the receptacles in one of the courses.

Because the stud 9 on the container is normally in depressed position it is only necessary to provide a roller for the stud 9′. If the stud 9′ is not depressed the container will swing to the left. Consequently, the stud 9′ need only be depressed when a document is intended for a receptacle located in one of the right hand courses of Fig. 2. The roller 30 adapted to engage with the stud 9′ is not shown in Fig. 13. Instead of being located at the front edges of the plates, relatively to the direction of travel of the container, as are the rollers for the studs 12 and 21, the roller for the stud 9 is arranged on the rear edge of one of the plates 26.

We claim:

1. In a sorting or distributing apparatus, the combination of a plurality of traveling supports adapted to receive and convey documents, a plurality of receptacles adapted to receive the documents conveyed by the traveling supports, delivery mechanism for effecting the delivery of said documents to said receptacles, expulsion mechanism carried by the traveling supports and adapted to forcibly expel said documents from said supports, and means for controlling said delivery mechanism to selectively distribute said conveyed documents to said receptacles.

2. Sorting or distributing apparatus according to claim 1, characterized by the arrangement of the receptacles in tiers along the line of travel of the supports, and the provision opposite each tier of receptacles of release devices having a normally operative position, and by the provision of control devices when not set engaging said release devices to move them to their inoperative position, and when set not engaging said release device so that release of the delivery mechanism is effected.

3. Sorting or distributing apparatus according to claim 1, characterized by the provision of spring pressed discharge flaps on the traveling supports, said flaps being held in their normal, closed positions by a locking pawl.

4. Sorting or distributing apparatus according to claim 1, characterized by the provision of discharge flaps on the traveling supports, said flaps being provided with a plurality of spring fingers, which upon opening of the flaps, effect the rapid expulsion of the documents from said supports.

5. Sorting or distributing apparatus according to claim 1, characterized by the provision along the line of travel of the supports of release devices and the provision on each of said traveling supports of a series of adjustable studs adapted to be set by control means to cooperate with said release devices for determining the point along the line of travel at which delivery of the documents is to be effected.

6. In a sorting or distributing apparatus having a plurality of traveling supports adapted to carry documents, delivery mechanism comprising a series of adjustable studs on each support, a pawl at each point of delivery, and lever arms fixed to the same shaft, one or more of said lever arms being arranged in the line of travel and adapted to engage with one or more of said studs and with said pawl to prevent the discharge of said documents from said supports, and one of said lever arms being so connected with said pawl that when said studs are not in a certain adjusted position all of the lever arms and the pawl are lifted to prevent discharge, and when said studs are in a certain adjusted position the lever arms are not lifted and the pawl is locked in its position so that discharge is effected.

7. Sorting or distributing apparatus according to claim 1, characterized by the provision of the traveling supports in the form of containers pivotally mounted to swing to varying angular positions in arcs perpendicular to the line of travel, and by the provision in the delivery mechanism of an adjustable member for each container which, by its engagement with the guide track, determines whether the container is to pivot to the right or to the left to its greatest angular position.

8. Sorting or distributing apparatus according to claim 1, characterized by the fact that the traveling containers are mounted on carriages, and by the provision of a plurality of pawls on said container and studs in said carriages, said studs being set by the control means to engage said pawls on the containers to prevent the out-swung containers from returning nearer to their central position than a point corresponding to the adjusted studs.

9. In a sorting or distributing apparatus a plurality of traveling carriages adapted to run on a track, a plurality of containers pivotally mounted in said carriages to swing in arcs perpendicular to said track, a plurality of receptacles arranged in tiers along said track, a stud in each of said carriages cooperating with a set member on each of said containers for swinging said containers to one side or the other, other studs on each of said carriages for determining the angular position at which each container's swing is arrested, lever and pawl mechanism at each transverse row of receptacles, and still other studs for engaging said lever and pawl mechanism to open each of said containers.

10. In a sorting or distributing apparatus having a plurality of traveling supports adapted to convey documents and each provided with a plurality of studs, control mechanism comprising a keyboard having a plurality of plates adapted to be displaced singly or in multiple by the depression of a single key, and a cam-member on each of said plates, said cams after displacement of their corresponding plates being thereby placed in the line of travel of and engaging with said studs to set them.

11. Sorting or distributing apparatus according to claim 1, characterized by the provision of supports having the form of narrow depending containers arranged with their narrow side at right angles to the direction of travel of the containers, and provided with outlet flaps on their bottoms, whereby the documents carried by said containers are conveyed in upright position on said outlet flaps.

In testimony whereof, we have signed our names to this specification.

JEAN JOSEPH MARTIN LAMBERT MARCHAND.
JACOBUS CORNELIS ANDRIESSEN.